March 26, 1963 R. D. MOORE 3,083,312
MOTOR FOR CONTRA ROTATING FANS
Original Filed Sept. 8, 1953 3 Sheets-Sheet 1

INVENTOR.
Robert D. Moore
BY
Paul E. Mullendore
ATTORNEY.

March 26, 1963  R. D. MOORE  3,083,312
MOTOR FOR CONTRA ROTATING FANS

Original Filed Sept. 8, 1953

INVENTOR.
Robert D. Moore
BY
Paul E. Mullendore
ATTORNEY

March 26, 1963 R. D. MOORE 3,083,312
MOTOR FOR CONTRA ROTATING FANS
Original Filed Sept. 8, 1953 3 Sheets-Sheet 3
Fig. 4A.
Fig. 4.
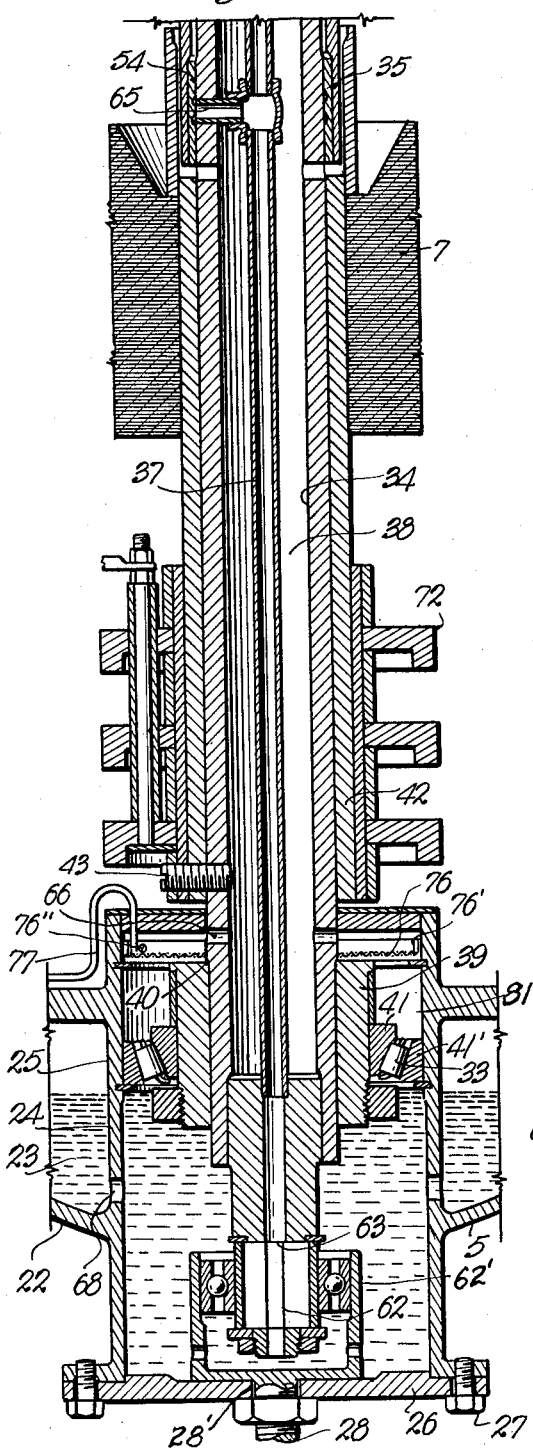
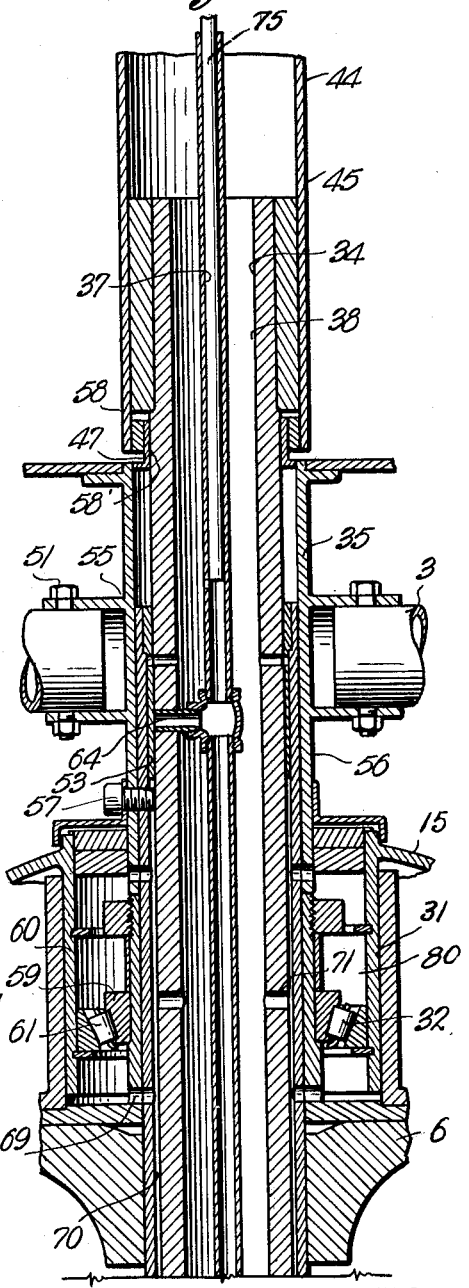
INVENTOR.
Robert D. Moore
BY
Paul E. Mullendore
ATTORNEY.

United States Patent Office 3,083,312
Patented Mar. 26, 1963

3,083,312
MOTOR FOR CONTRA ROTATING FANS
Robert D. Moore, Kansas City, Mo., assignor to The Moore Company, Kansas City, Mo., a corporation of Missouri
Original application Sept. 8, 1953, Ser. No. 378,907, now Patent No. 2,952,787, dated Sept. 13, 1960. Divided and this application Aug. 29, 1960, Ser. No. 52,691
6 Claims. (Cl. 310—157)

This invention relates to motors for operating axial flow fans which provide forced movement of air and similar gases in a direction parallel to the fan axis, the present application being a division of my copending application Serial No. 378,907, filed September 8, 1953, and which has matured into Patent No. 2,952,787, issued September 13, 1960.

Fans of this character impart a rotational air velocity which reduces efficiency. The higher the pressure at a given r.p.m. and velocity, the greater will be the rotation of the discharge and greater the loss in power. Eventually the point is reached where axial flow breaks down entirely and the air rotates with the blades of the fan. In small fan units, it is practical to install guide vanes which turn the air counter to the deflection imparted by the blades of the fan, thereby straightening the flow and providing greater efficiency at higher pressures. But in larger fans and particularly in fans handling corrosive fluids, the cost of such guide vanes becomes prohibitive.

The present invention overcomes these difficulties by providing a motor for driving a plurality of contra-rotating fan wheels in tandem and arranged to operate the fan wheels in opposite directions so that the air rotated in on direction by the first fan wheel is reversed and straightened into a direct axial flow by the second fan wheel. This results in increased efficiency and lower power costs. It also makes practical the use of corrosive resistant metals in the parts exposed to corrosive fluids.

It is a further object of the invention to provide a direct drive for effecting contra-rotation of the respective fan wheels and thereby obtain greater aerodynamic efficiency with greater simplicity and lower cost.

Other objects of the invention are to provide a motor for driving a fan unit having a minimum of vibration and greater rigidity utilizing relatively small shaft diameters; to provide the motor with a main shaft carrying one rotor for driving one fan wheel and a tubular shaft carrying the other rotor for driving the other fan wheel; to provide an antifriction bearing for individually journaling each shaft so that each shaft is journaled in its own bearing, thereby supporting the load with relatively small bearings; to provide a motor enclosure which is utilized for support of the fan unit; and to provide a fan construction in which it is feasible to utilize corrosive resistant materials.

In accomplishing these and other objects of the invention, as hereinafter pointed out, I have provided an improved structure, the preferred form of which is illustrated in the accompanying drawings wherein.

Figure 1:
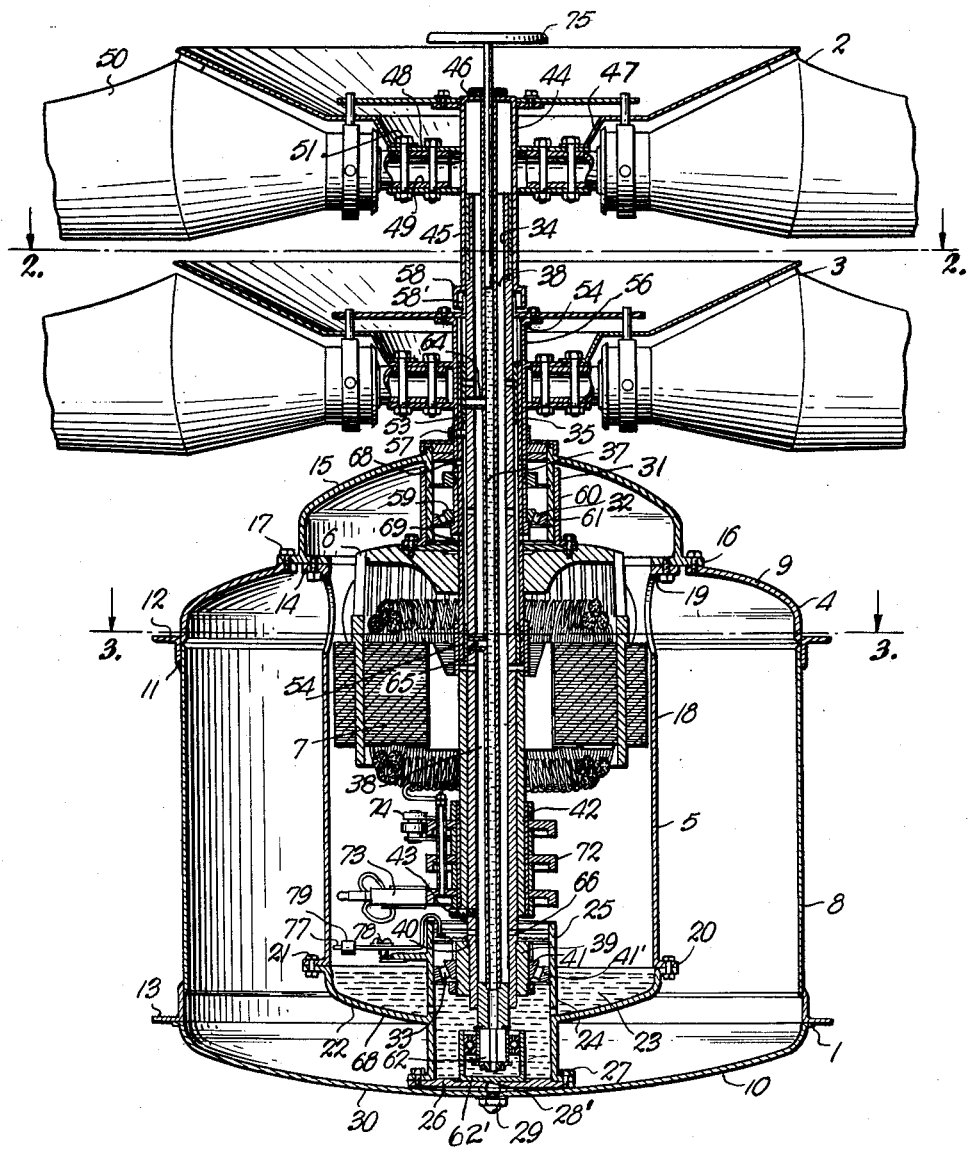
FIG. 1 is a longitudinal section through a fan unit equipped with a motor constructed in accordance with the present invention.
Figure 2:
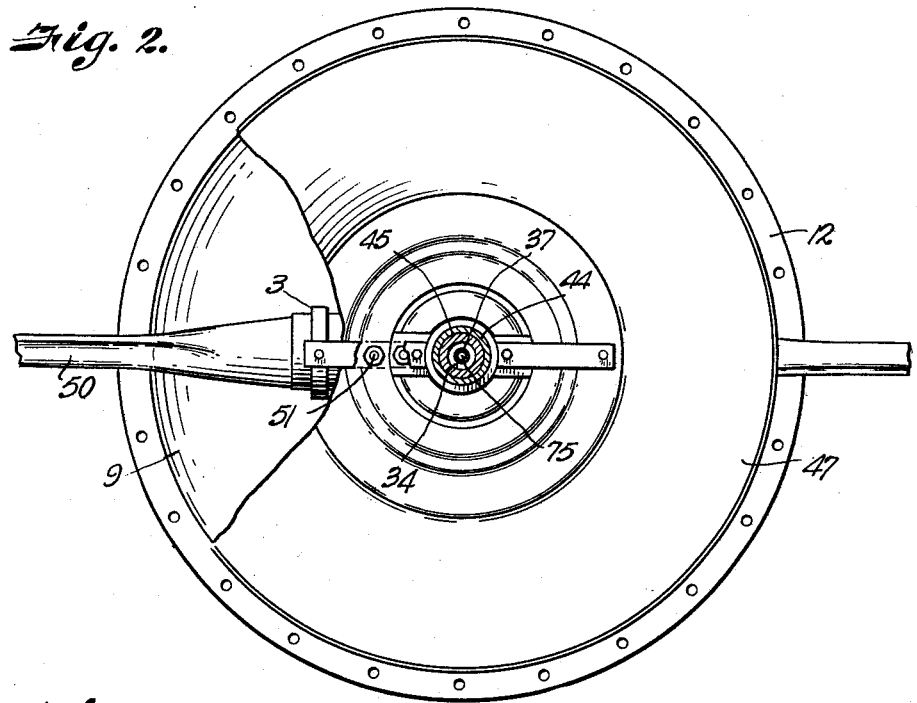
FIG. 2 is a cross section on the line 2—2 of FIG. 1.
Figure 3:
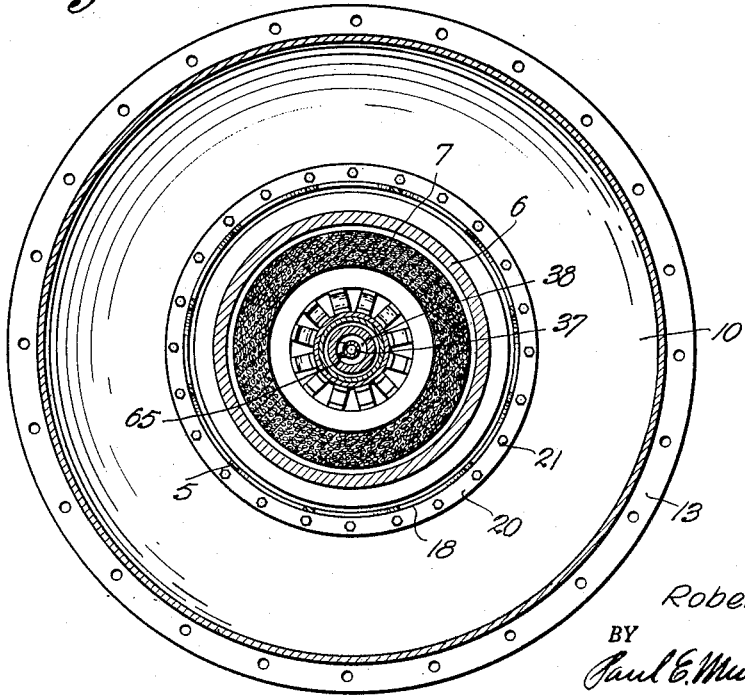
FIG. 3 is a cross section on the line 3—3 of FIG. 1.

FIGS. 4 and 4–A are an enlarged fragmentary section through the central portion of the unit.

Referring more in detail to the drawings:

1 designates a fan unit and motor assembly constructed in accordance with the present invention and which includes contra-rotating fan wheels 2 and 3 that are carried on a stationary shell 4 which is adapted for support within an air or gas flow duct in any suitable manner. The shell 4 encloses an electrical motor housing 5 which contains contra-rotating elements or rotors 6 and 7 that are respectively connected with the fan wheels 2 and 3 as later described.

The stationary shell 4 preferably includes a cylindrical wall 8 closed at the ends by outwardly crowned heads 9 and 10. The upper head 9 is preferably connected to the upper ends of the wall 8 through a ring 11 having a laterally extending annular flange 12. The parts just described are preferably welded together to provide joints which exclude corrosive air or gases in which the unit may be operated. The lower head 10 is preferably removable from a similar ring 13 welded circumferentially of the lower end of the wall 8 as later described. The rings 11 and 13 may be used for attaching supporting elements (not shown) by which the fan unit is mounted coaxially within a flow duct or opening of a cooling tower or the like. The upper head 9 has an axial opening 14 that is closed by a dome shaped cover 15. The cover 15 has an annular flange 16 that is secured to the head 9 by fastening devices such as cap screws 17 to provide a tight joint and permit removal of the cover 15 for inspection and repair of the rotating elements 6 and 7 of the motor.

The motor housing 5 has a cylindrical wall 18 having flanged upper and lower ends 19 and 20 that are adapted to pass through the opening 14 when the parts are assembled.

Fixed to the lower flange 20 by suitable fastening devices such as bolts 21 is a closure 22 of concavo convex form to provide an oil reservoir 23 surrounding a bearing housing 24. The bearing housing 24 includes a cylindrical wall 25 that extends axially through the center of the closure 22 and the lower end thereof is closed by a plate 26 which is secured thereto by fastening devices 27.

The head 10 of the outer shell is retained in position by connecting it with the closure plate 26. This is effected by providing the closure plate with an axial opening 28' through which a depending stud 28 extends and which also extends through a corresponding opening in the head 10. The stud carries nuts 29 on the end thereof to clamp the periphery 30 of the head 10 therebetween and in sealing contact with the flange of the lower ring 13. The cover 15 carries a depending housing 31 which forms an enclosure for a thrust bearing 32 which cooperates with a similar anti-friction thrust bearing 33 that is carried within the bearing housing 24 in forming the main journals for the fan wheel shafts and to resist the axial thrusts of the fan wheels incidental to operation thereof as later described.

The construction of the fan wheel shafts is an important feature in the present invention for making a contra-rotating fan unit practical since the shafts must be sufficiently strong and rigid to withstand the stress thereon and yet be of small enough diameter to accommodate practical sized antifriction bearings.

In the present invention the shaft 34 for the fan wheel 2 is a substantially heavy main support member of relatively small outer diameter to provide the support for a tubular shaft 35 for driving the innermost fan wheel 3.

The shaft 34 has its lower end directly journaled in the lower thrust bearing 33 and its upper end extends through the bearing housing 31 and projects from the cover 15 and tubular shaft 35 a distance sufficient to mount the upper fan wheel 2 thereon.

In order to provide for lubrication of the various bearings, the main shaft 34 is hollow to accommodate an axial positioned lubricant supply pipe 37 and leave annular lubricant return passageway 38 for return of lubricant to the reservoir 23.

The lower end of the shaft 34 has a collar 39 that seats against a shoulder 40 thereon and forms a support for the inner race 41 of the thrust bearing 33, the outer race 41' of the bearing being suitably supported by the wall 25. The shaft 34 is reinforced by an outer sleeve 42 that extends from a point spaced from the collar 39 through the rotor 7 of the electric motor. The rotor 7 is pressed onto the upper end of the sleeve 42 so that turning of the rotor effects turning of the sleeve 42 and the main shaft 34 through a driving connection such as one or more screws 43 that connect the lower end of the sleeve with the shaft as shown in the drawing.

The upper end of the main shaft 34 mounts a hub 44 of the fan wheel 2. The hub 44 includes a substantially elongated relatively thin walled tube 45 that may be formed of corrosive-resistant metal. The upper end of the tube is closed by a cap 46 that connects with a disk 47 which closes the space surrounding the hub of the upper fan wheel. The hub also includes radially extending sockets 48 for receiving shanks 49 of fan blades 50, the shanks being secured in the sockets by fastening devices such as bolts 51 that extend diametrically through the parts as shown in FIG. 1.

The tubular shaft 35 is rotatable about the main shaft 34 intermediate the sleeve 42 and the lower terminal of the hub 44 to connect the hub 52 of the rotor 6 with the fan wheel 3. The tubular shaft 35 has a larger inner diameter than the outer diameter of the main shaft 34 to provide a space therebetween for receiving bearing sleeves 53 and 54 that may be pressed within the tubular shaft 35 for bearing contact with the main shaft 34. The hub 55 of the fan wheel 3 conforms with the fan wheel 2 and the tube portion 56 also encases the portion of the tubular shaft 35 that projects from the cover 15 of the stationary shell 4.

The tube 56 is connected with the tubular shaft 35 to effect a driving connection therebetween by means of a screw 57. The hub tube 45 of the fan wheel 2 has a skirt portion 58 which cooperates with an upper extension 58' of the hub tube 56 to form a rotating seal therebetween.

The motor parts in the present illustration conform with the corresponding parts of the motor disclosed in Patent No. 2,596,783, issued to me May 15, 1952. However, in the present instance both motor rotors 6 and 7 are left free to rotate, with one rotor rotating reversely to the other to drive the fan wheels 2 and 3 in reverse or contra directions.

The hub tube 56 of the fan wheel 3 is a sufficient length to extend within the upper bearing housing so as to carry the inner race 59 of the bearing 32 in supporting the fan wheel 3 against axial thrust produced incidental to operation thereof, a collar 60 being provided on the lower end of the quill to seat the inner race. The outer race 61 is suitably fixed in the bearing housing 31 against axial thrusts.

Mounted within the sump of the lower bearing housing is a pump 62 having a driving connection as at 63 with the lower end of the main shaft 34 to pump oil from the sump upwardly through the pipe 37 for discharge to the sleeve bearings 53 and 54 through branch outlets 64 and 65 as shown in FIG. 1. The oil on passing through the bearing sleeves 64 and 65 returns through the passageway 38 and is discharged onto a filter screen 76 that covers the upper end of the lower bearing housing, the oil being admitted onto the filter screen through ports 66 in the main shaft. The oil, after passing through the filter screen, is discharged into the reservoir 23 and returned to the sump through ports 68 in the wall 25 of the bearing housing.

The lower thrust bearing 33 is lubricated directly by the oil contained in the sump, however, the upper thrust bearing 32 is lubricated by the circulated oil carried to the upper bearing sleeve 53, a portion of which passes between the main shaft 34 and the quill shaft 35 by way of ports 68 into the housing for the upper thrust bearing. The oil is returned from the upper bearing housing 31 through ports 69 that connect with an annular passageway 70 from where the oil is returned to the main shaft through ports 71.

The collector rings 72 for the motor are mounted for rotation with the main shaft which is turned by the rotor 7 and the brushes 73 may be suitably mounted in stationary position by suitable supports 74 within the shell 4 of the motor housing.

Pressure is maintained on the oil by a plunger 75 which extends into the oil supply pipe 37 and serves as a visual indicator of the pressure as the plunger is lifted by the pump pressure. The pump 62 is contained in a bearing housing 62' that carries the stud 28 previously referred to.

An automatic cutoff is provided in case of oil failure. The filter screen 76 forms the bottom of a pan 76' which is movably mounted on a cross pin 76" to support the pan just above the lower thrust bearing 33. A lever arm 77 is attached to the pin 76' and mounts a mercury switch 78 that is connected in series with the holding coil of the starter solenoid (not shown) for the electric motor. With the oil flowing, the pan is kept full and the mercury switch is closed, but, should the oil cease, the oil leaks through the screen 76 of the pan 76', whereupon a weight 79 on the lever 77 overbalances the pan. This trips the mercury switch and breaks the holding coil circuit.

In operation, closure of the motor circuit energizes the motor windings to cause the rotor 6 to rotate counter to the rotor 7 so that the main shaft is driven in one direction to turn the fan wheel 2 and the tubular shaft 35 is rotated in the opposite direction to turn the fan wheel 3. Operation of the main shaft drives the pump 62 to elevate the oil from the oil sump of the lower bearing housing. The oil acts against the rod 75 to create a pressure for forcing the oil through the outlets supplying the sleeve bearings 53 and 54. Part of the oil supplied to the upper sleeve bearing gravitates to the upper bearing housing for maintaining a supply of lubricant for the upper thrust bearing 32. Excess oil is returned from the respective bearings through the oil return passageway for discharge into the pan 76'. The oil seeps through the screeen 76 of the pan 76' and returns to the oil reservoir 23 which supplies the oil to the sump of the lower bearing housing. As long as there is oil contained within the pan, the motor circuit is closed and the fan continues to operate, however, in case of oil failure, the weight 79 overbalances the weight of the pan and actuates the mercury switch 78 to effect opening of the motor circuit through a holding coil circuit as above described.

Rotational velocities set up through rotation of one of the fan wheels is counteracted by contact with the other fan wheel so that the air discharge is maintained in a straightaway direction parallel with the axis of the fan wheels.

It is obvious that thrust of the fan wheel 2 is carried by the lower thrust bearing 33 and that of the fan wheel 3 is carried by the upper thrust bearing 32. Each of the thrust bearings has its own individual oil well to assure adequate supply of lubrication to these bearings and no oil seals are necessary. The particular mounting of the thrust bearings requires no adjustment to maintain proper operation of the fan wheels. The thinness of the sleeve bearings 53 and 54 allow use of a relatively large inner or main shaft 34.

The oil pump is of a type capable of operation in either direction so that the direction of the fan blades may be reversed to change the direction of air discharge, for example, when the fan is installed on a cooling tower and it becomes necessary to de-ice the intake louvers of the tower.

It is obvious that the unit is so designed that the entire motor assembly may be lifted out of the shell 4 upon removal of the dome cover 15, or, if desired, the various motor parts may be easily accessible by dropping the bottom head 10 of the outer shell and removing the closure 22.

The construction of the unit is substantially gas tight to exclude moisture and corrosive vapors. The structure also provides for relatively inexpensive shielding of the corrosive parts by non-corrosive metal from which the fan hubs and other exposed fan parts may be constructed.

While the present drawings and description relate to a vertical type fan, the fan may be used in horizontal position by use of an additional set of antifriction bearings in the bearing housings, the bearing housings having been illustrated of sufficient depth to accommodate such bearings in the spaces 80 and 81 (see FIGS. 4 and 4A).

While the tubular shaft 35 is sleeved relatively to the main shaft, each shaft has its own individual antifriction bearings, 32 and 33, respectively, to journal the respective shafts in the motor housing. Each shaft is, therefore, journaled directly within its own thrust bearing, and relatively simple bearings such as 53 and 54 may be used between the shafts to maintain their coaxial alignment.

What I claim and desire to secure by Letters Patent is:

1. An apparatus of the character described, including a shell providing a stationary support, an electric motor enclosed in the shell and having contra-rotating field and armature rotors, axially aligned antifriction bearings mounted in the shell at opposite ends of the motor, a main shaft carrying one of the rotors and having one end journaled directly by one of said antifriction bearings with the other end projecting through the other antifriction bearing, a tubular shaft carrying the other rotor and coaxially mounted exteriorly of the main shaft and having a midportion thereof directly journaled by said other antifriction bearing, and means spaced from the respective sides of said other antifriction bearing for journaling the respective ends of the tubular shaft on the main shaft whereby axial thrust of each shaft is directly supported respectively by one of said antifriction bearings.

2. An apparatus of the character described, including a shell providing a stationary support, an electric motor enclosed in the shell and having contra-rotating field and armature rotors, axially aligned antifriction thrust bearings mounted in the shell at opposite ends of the motor, a main shaft carrying one of the rotors and having one end journaled directly by one of said antifriction thrust bearings with the other end projecting through the other antifriction thrust bearing, a tubular shaft carrying the other rotor and coaxially mounted exteriorly of the main shaft and directly journaled by said other antifriction thrust bearing, the only driving connection between the tubular and main shafts being that established through the electromotive force between the field and armature rotors, and means journaling the tubular shaft on the main shaft and independent of axial thrust of the main shaft on said one antifriction thrust bearing.

3. An apparatus of the character described, including a shell providing a stationary support, an electric motor enclosed in the shell and having contra-rotating field and armature rotors, axially aligned thrust bearings mounted in the shell at opposite ends of the motor, a main shaft carrying one of the rotors and having one end journaled directly by one of said thrust bearings with the other end projecting freely through the other thrust bearing and free of axial restraint by the said other thrust bearing, a tubular shaft carrying the other rotor and coaxially mounted exteriorly of the main shaft and having a midportion thereof directly journaled by said other thrust bearing and free of axial restraint by the said one thrust bearing, the only driving connection between the tubular and main shafts being that established through the electromotive force between the field and armature rotors, and means spaced from the respective sides of said other thrust bearing for journaling the respective ends the tubular shaft on the main shaft whereby each shaft is individually restrained in axial directions by its own thrust bearing.

4. An apparatus of the character described, including a shell providing a stationary support, an electric motor enclosed in the shell and having contra rotating field and armature rotors, thrust bearings mounted in the shell at the respective ends of the motor, a main shaft carrying one of the rotors and having one end journaled directly by one of said thrust bearings and the other extending freely through the other thrust bearing to project from said shell, a tubular shaft carrying the other rotor and coaxially mounted exteriorly of the main shaft and journaled by said other thrust bearing and having a projecting end terminating short of the projecting end of the main shaft, and fans on the projecting ends of the shafts, said thrust bearings providing separate direct axial restraint for each respective shaft under thrust thereof by the counter rotation of the fans.

5. An apparatus of the character described, including a generally cylindrical stationary shell having one end closed and the other end provided with an axial opening, a cover closing the opening, a motor housing within the shell and having one end coaxially supported by the cover and having the opposite end closed, axially aligned bearing housings, one being carried by said cover and the other by the closed end of the motor housing, thrust bearings mounted in said bearing housings, contra rotating field and armature rotors rotatable in the motor housing, a relatively long main shaft carrying one of the rotors and having one end journaled directly in the thrust bearing nearest the closed end of the stationary shell and the other end of said main shaft projecting through the other thrust bearing and through said cover, a shorter tubular shaft carrying the other rotor and coaxially rotatable upon the main shaft and having a midportion directly journaled in said bearing housing which is carried by the cover, said shorter tubular shaft also projecting through the opening in the cover but terminating short of the projecting end of the main shaft, bearings between the ends of the tubular shaft and said main shaft and spaced from the said thrust bearing for maintaining coaxial relation of said shafts, and counter rotating fans mounted on the projecting ends of the respective shafts whereby the axial thrusts of the respective fans are individually restrained in axial directions by the thrust bearings that directly mount the respective shafts.

6. An apparatus of the character described, including a generally cylindrical stationary shell having one end closed and the other end provided with an axial opening, a cover closing the opening, a motor housing within the shell and having one end coaxially supported by the cover and having the opposite end closed, axially aligned bearing housings, one being carried by said cover and the other by the closed end of the motor housing, thrust bearings mounted in said bearing housings, contra rotating field and armature rotors rotatable in the motor housing, a relatively long main shaft having one end journaled directly in the thrust bearing that is carried by said closed end of the motor housing and having the other end of said main shaft projecting through the other thrust bearing and through said cover, a shorter tubular shaft coaxially rotatable upon the main shaft and having a midportion extending through said other thrust bearing and through the opening in the cover but terminating short of the projecting end of the main shaft, bearings between the ends of the tubular shaft and said main shaft and spaced from the said other thrust bearing for maintaining coaxial relation of said shafts, a sleeve upon the main shaft for carrying one of the rotors, means for fixing the sleeve to the main shaft, a sleeve on the tubular shaft for carrying the other of said rotors, means for fixing the last named sleeve to the tubular shaft, said last named sleeve being directly journaled in the said other thrust bearing, and counter rotating fans mounted on the projecting ends of the respective shafts whereby the axial thrusts of the respective fans are individually restrained in axial directions by the thrust bearings that directly mount the respective shafts.

References Cited in the file of this patent

UNITED STATES PATENTS

| | | |
|---|---|---|
| 2,451,990 | Sutherland | Oct. 19, 1948 |
| 2,462,182 | Guerdan et al. | Feb. 22, 1949 |